(12) United States Patent
Kanza et al.

(10) Patent No.: US 11,533,636 B2
(45) Date of Patent: Dec. 20, 2022

(54) RAN PLANNING USING GRID-BASED OPTIMIZATION

(71) Applicant: AT&T Intellectual Property I, L.P., Atlanta, GA (US)

(72) Inventors: Yaron Kanza, Fair Lawn, NJ (US); Arun Jotshi, Parsippany, NJ (US); Velin Kounev, Weehawken, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/389,555

(22) Filed: Jul. 30, 2021

(65) Prior Publication Data

US 2022/0377570 A1 Nov. 24, 2022

Related U.S. Application Data

(60) Provisional application No. 63/189,921, filed on May 18, 2021.

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ..... H04W 16/00; H04W 16/18; H04W 16/26; H04W 16/30
See application file for complete search history.

(56) References Cited

U.S. PATENT DOCUMENTS 9,723,588 B1 * 8/2017 Urrutia ................ G01S 5/14
2017/0245238 A1 * 8/2017 Kim .................... H04W 64/003

FOREIGN PATENT DOCUMENTS

WO WO-2020123208 A1 * 6/2020 ............ H04W 16/18

OTHER PUBLICATIONS

"5G", Wikipedia: https://en.wikipedia.org/wiki/5G, available at least as of May 10, 2021, May 10, 2021, 29 pgs.
"Atoll Overview", Atoll Radio Planning Software Overview (RF Planning and Optimisation) | Forsk, available at least as of May 10, 2021, 6 pages.
"Attenuation", Wikipedia, available at least as of May 10, 2021, 8 pages.
"Free-space path loss", Wikipedia, available at least as of May 10, 2021, 5 pages.
"Photon mapping", Wikipedia, available at least as of May 10, 2021, 4 pages.
"Quadtree", Wikipedia, available at least as of May 10, 2021, 12 pages.
"Radio propagation", Wikipedia, available at least as of May 10, 2021, 13 pages.

(Continued)

*Primary Examiner* — Kevin Kim
(74) *Attorney, Agent, or Firm* — Guntin & Gust, PLC

(57) ABSTRACT

Aspects of the subject disclosure may include, for example, a process for selecting equipment locations such as of cellular antennas, based on a combination of a geospatial grid representation of a planning area and optimization algorithms (which can be combined with propagation models and a 3D model of the world) where the optimization algorithm can select a deployment from a large space of options and would make RAN planning much more efficient. Other embodiments are disclosed.

20 Claims, 9 Drawing Sheets

(56) References Cited

OTHER PUBLICATIONS

"Signal-to-interference-plus-noise ratio", Wikipedia: https://en.wikipedia.org/wiki/Signal-to-interference-plus-noise_ratio, available at least as of May 10, 2021, May 10, 2021, 3 pgs.

"TensorFlow Core", Machine Learning for Beginners and Experts, Visit Forum https://discuss.tensorflow.org, available at least as of May 10, 2021, 8 pages.

Alla Chaitanya, Chakravarty R. et al., "Interactive Reconstruction of Monte Carlo Image Sequences using a Recurrent Denoising Autoencoder", ACM Transactions on Graphics, vol. 36, No. 4, Article 98, Jul. 2017, 12 pages.

Jensen, Henrik W., "Global Illumination using Photon Maps", Extended version of Rendering Techniques '96 (Proceedings of the Seventh Eruographics Workshop on Rendering), 1996, 17 pages.

\* cited by examiner

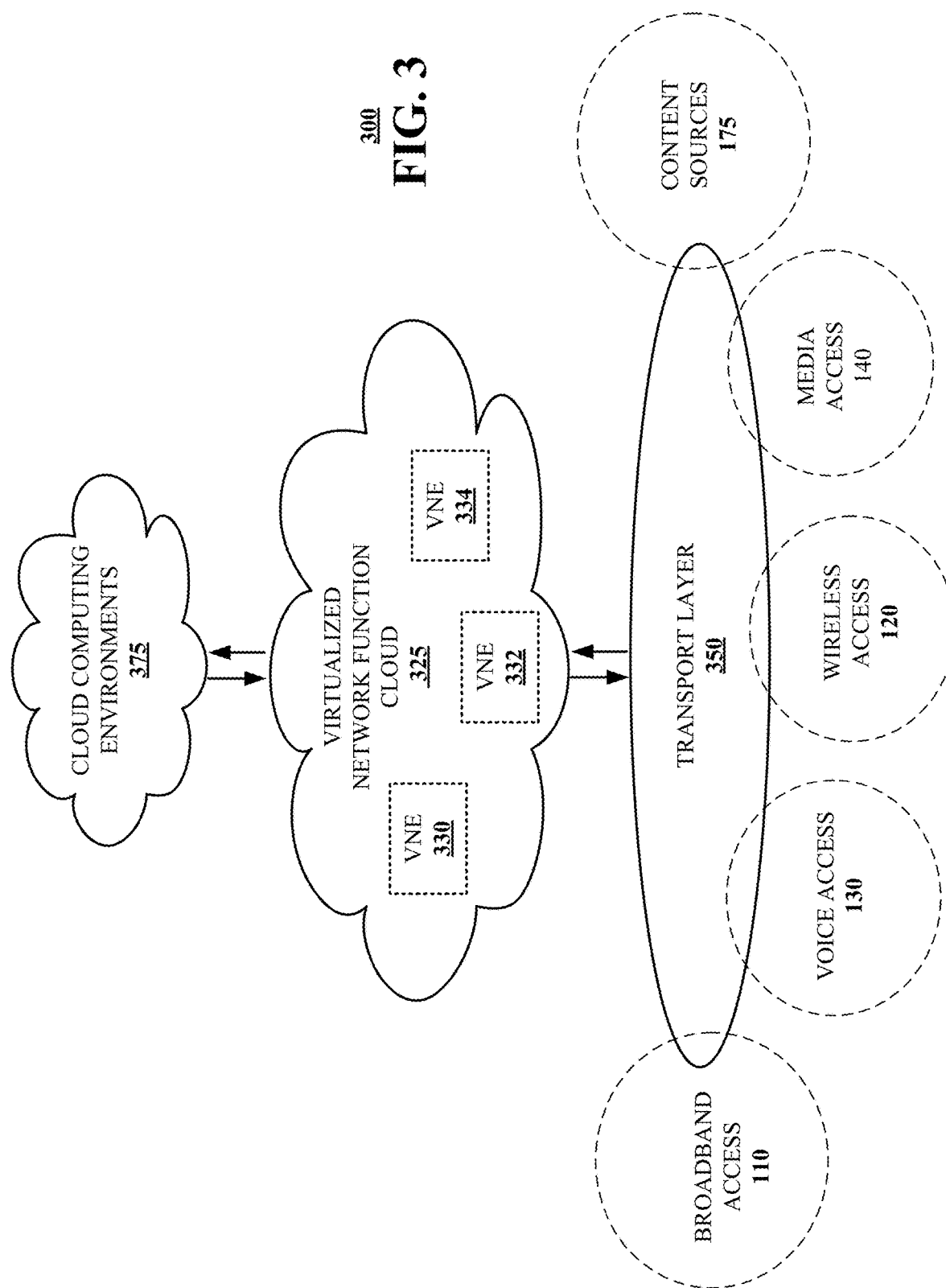

RAN PLANNING USING GRID-BASED OPTIMIZATION

CROSS REFERENCE TO RELATED APPLICATION(S)

This application claims the benefit of priority to U.S. Provisional Patent Application No. 63/189,921, filed on May 18, 2021. All sections of the aforementioned application are incorporated herein by reference in their entirety.

FIELD OF THE DISCLOSURE

The subject disclosure relates to radio access network (RAN) planning using grid-based optimization.

BACKGROUND

One of the main activities in planning of cellular networks is deciding where to position equipment such as the cellular antennas. Choosing antenna and/or other equipment locations is needed for building a reliable cellular network, with good coverage and reduced or no interference between transmissions.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for an approach for selecting the locations of the cellular antennas, based on the combination of a geospatial representation (e.g., a grid) of the planning area and optimization algorithms. The use of an optimization algorithm combined with propagation models and a three-dimensional (3D) model of the world could lead to a revolution in the way cellular networks are planned and deployed. The optimization algorithm will select an optimal or improved deployment from a large space of options and would make RAN planning much more efficient, and the result networks more optimal. Instead of relying on human labor, a tool could apply optimization and artificial intelligence (AI) to examine a large variety of deployment layouts and effectively utilize available data for best decisions.

One or more embodiments represent the planning task as an optimization problem as follows which can utilize several components. First, an appropriate geospatial model of the world should be built and used. Second, the coverage of existing cellular antennas and of potential deployment options should be computed. Also, interference between antennas should be computed. Third, the problem should be formulated as an optimization problem, with appropriate constraints and objective function. Finally, the algorithm should select not only sites for new antennas but also parameters like tilt, transmission strength, transmission frequency, etc. This embodiment is a comprehensive solution that comprises all these steps, in a way that allows specifying constraints and objective, and conducting the entire planning process accordingly.

In one embodiment, by effectively computing an optimal layout for cellular antennas in a given area, the tool could make planning much more efficient and the result network more robust and effective. The coverage of the planned network will be better than what a human planner could achieve because of the use of an optimizer and due to relying on Big Data—geospatial and network usage. A network planning tool will examine many different layout options for the antennas, the effect of small changes in the position or tilt of an antenna and the effect of other parameter selection. This would support an optimization of the antenna positioning, to guarantee a more reliable network (better coverage) at a lower installation (CapEX) and maintenance (OpEX) costs. Other embodiments are described in the subject disclosure.

Figure 1:
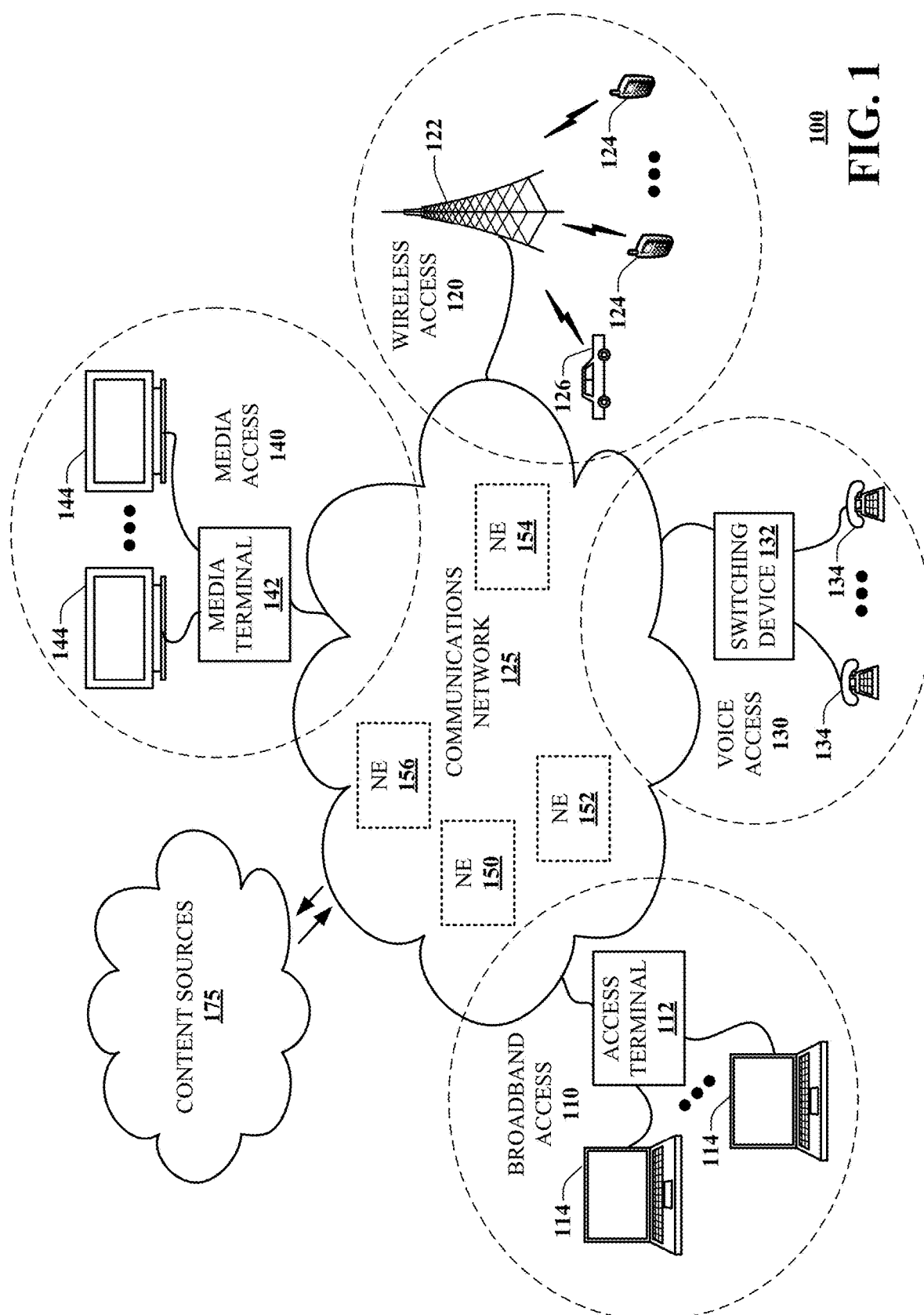
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part selecting equipment locations such as of cellular antennas, based on a combination of a grid geospatial representation of a planning area and optimization algorithms (which can be combined with propagation models and a 3D model of the world) where the optimization algorithm can select a deployment from a large space of options and would make RAN planning much more efficient.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP)

network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.1 lac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
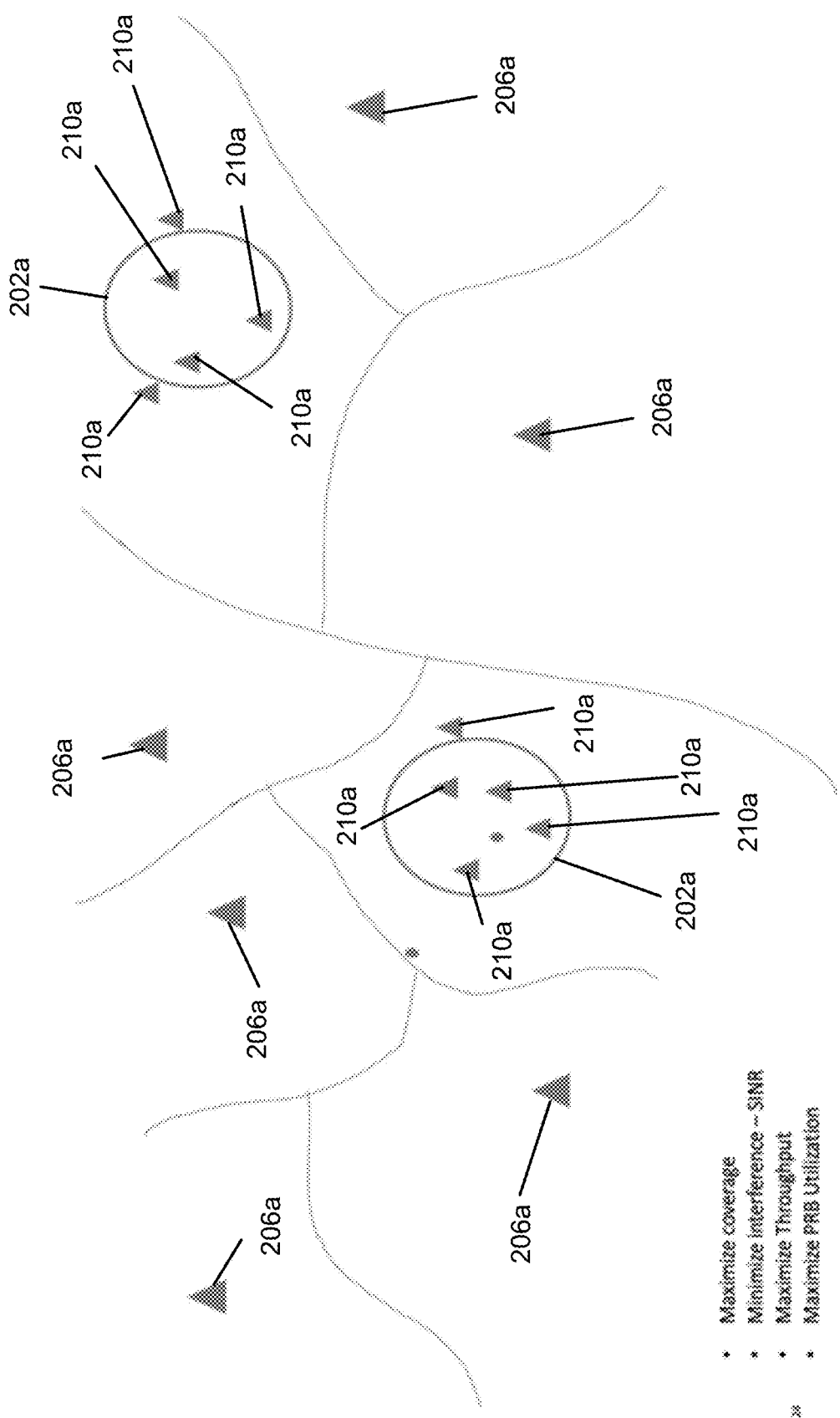
FIG. 2A-2C are block diagrams illustrating an example, non-limiting embodiments of systems functioning within the communication network of FIG. 1 in accordance with various aspects described herein.
Figure 2B:
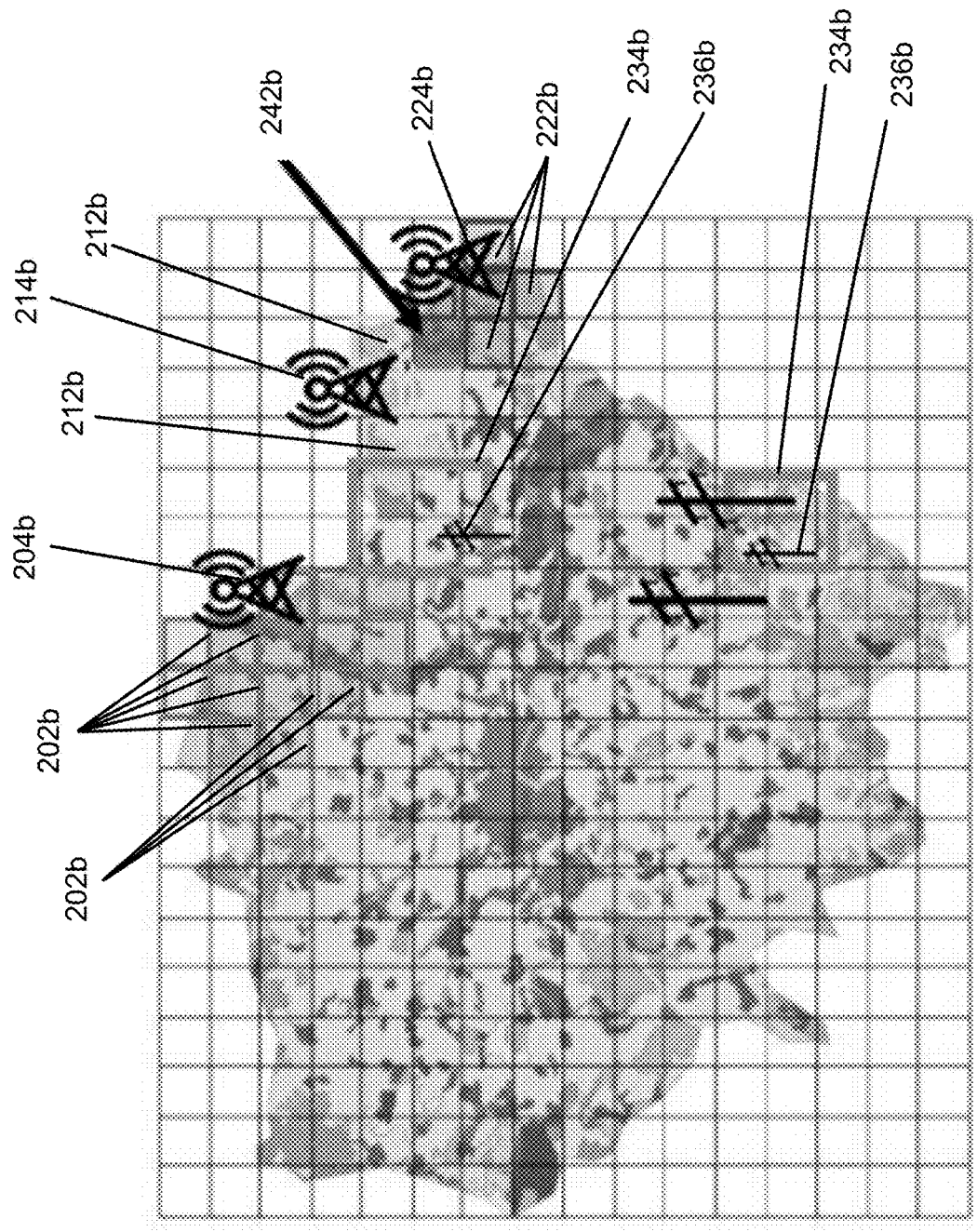
Figure 2C:
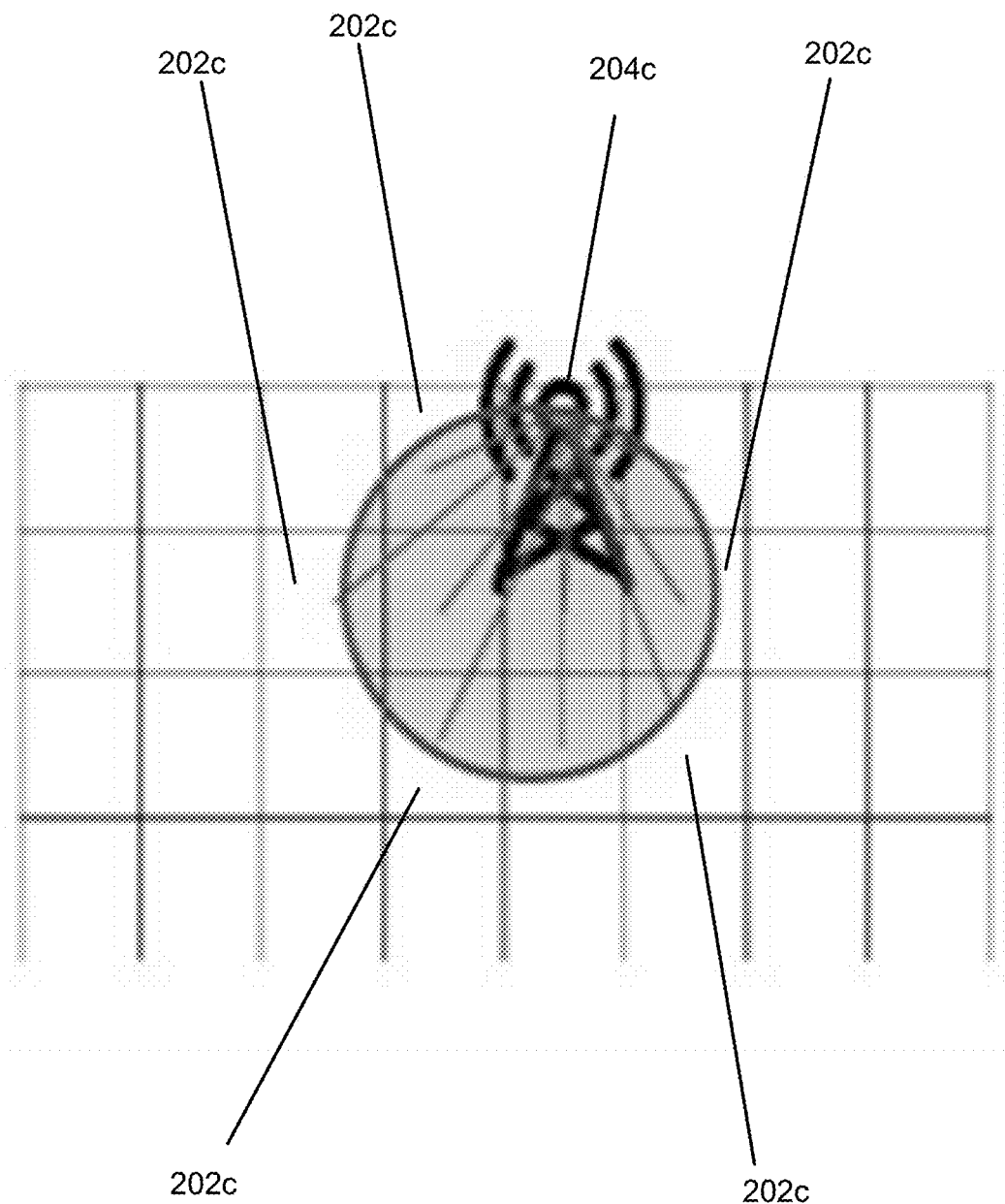

FIG. 2A-2C are block diagrams illustrating or related to an example, non-limiting embodiment of one or more systems functioning within the communication network of FIG. 1 in accordance with various aspects described herein.

When planning a Radio Access Network (RAN) or extending it, deployment parameters of cellular antennas, like location, transmission power, tilt, frequency etc, should be selected in an effective way, in terms of the overall performance of the network and the number of antennas needed to cover an area. Lack of cellular coverage in critical areas could severely impact customers. However, there is a limited number of antennas a network operator or service provider, such as a telecom company, can deploy and maintain. Hence, antenna locations and transmission parameters should be selected carefully while taking usage statistics and geospatial constraints into account. The need for careful planning is becoming more critical with the advent of 5G networks and the growing use of shortwave transmissions. The short radio waves have a small range, and they are highly susceptible to interferences and obstacles like buildings and trees. This requires densifying the network by adding many new antennas, and carefully taking antenna locations into account. Densification can also lead to interference between antennas, and careful planning should minimize such interferences.

In these embodiments antenna-location selection is represented as an optimization problem. The network planner provides locations of existing antennas, areas where cellular coverage should be added, and deployment constraints—geospatial and others. The setting is transformed into an optimization problem to select the best deployment. The approach is general, in the sense that the computation can be done for a variety of parameters and constraints, and for different types of optimization goals (objective functions), based on the needs specified by the network planner.

The state of the art, as it previously existed, is a highly manual and iterative process where planners determine soft locations based on coverage/usage/competitive analytics and then utilize static propagation modeling tools to design the network. Often, they do manual iterations to determine location and transmission parameters; every time checking manually to see if the changes are producing desired positive results or negative results. This process is highly manual, iterative, time consuming, and more importantly, sub-optimal.

The RAN planning setting consists of a geospatial map of the intended deployment area, with (1) existing antennas, (2) potential antenna locations such as communication towers, utility poles, high buildings, water towers, etc. It can also be assumed that there is statistics about network usage in different regions. Based on usage statistics and signal strength (cellular coverage), the network planner finds areas that should be covered by a new antenna. The planner needs to select antenna locations, i.e., places for installation of new antennas as well as the transmission parameters like tilt, power and frequency. For example, in FIG. 2A the circles 202a are areas where cellular coverage should be added, and antennas should be deployed accordingly. FIG. 2A is an example of a deployment area, where first triangles 206a are existing antennas, the circles 202a are areas where the cellular coverage is insufficient and the signal strength should be increased, and second triangles 210a are potential antenna locations for increasing the signal strength in the selected areas.

There can be many potential locations for adding the new antennas. The selection is based on (1) the gained cellular coverage in the designated areas, for each potential antenna location, (2) covering as much area with as few antennas as possible, and (3) reducing (e.g., minimizing) the intersection between coverage areas of different antennas, especially if they have the same frequency, to reduce (e.g., prevent) interference. To cope with that, an exemplary solution is to present the setting as an optimization problem. The model can either be discrete or continuous. For efficiency, it is herein described as a discrete optimization problem.

As to geospatial model and geospatial constraints: in the computations, it is assumed that there is either a 3D vectorial model of the area or a digital surface model (DSM) representation of the planning area. A 3D vectorial model includes rectangular prisms (cuboids) that represent geospatial obstacles like building and trees. A DSM representation is typically a light detection and ranging (LiDAR) point cloud where each point has latitude-longitude coordinates and height (ground plus clutter), and the points are ordered as a grid of points. The resolution of the LiDAR points can vary. Typical resolutions are 10 m between points for coarse resolution, 1 m distance between points for medium resolution, and 10-15 cm between points for high resolution. Note that if there is a ground level height represented by a digital elevation model (DEM), the LiDAR point cloud can be transformed into a 3D vectorial model where each point is replaced by a cuboid whose base is a square around the point, according to the resolution (10 m length and width for a resolution of 10 m), and the height is the height of the DSM point above ground level (DSM–DEM). Aspects of the disclosure may incorporate other types of models, such as for example a digital terrain model (DTM) of a planning or geographic area.

As to coverage grid: the first step of the computation is to create a dense grid and for each grid cell test which antennas cover it. This is done as a precomputation step, before starting the optimization process. Note that in the model each grid cell has a ground height (represented by the DEM) and ground plus clutter height (represented by the DSM). Also note that the coverage grid does not need to have the same resolution as the DSM or DEM model. Coverage is typically measured for a point in the middle of the base of the grid cell, but it can be computed for other heights as well. The coverage of antennas is the set of cells for which the transmission from the antenna can be received with sufficient signal strength. For existing antennas, the signal strength can be measured. When there is no measured signal strength or when the computation is for a potential location for a new installation, the coverage is estimated. The estimation is by testing if there is a line of sight between each cell and the antenna, i.e., by testing that the direct line between the antenna and the center of the cell does not intersect any cuboid in the 3D representation of the area. Different propagation models can be used, e.g., signal strength that decays as the distance from the antenna grows (SINR), radio waves that can go through obstacles, with some decay, reflection of transmissions from obstacles, diffraction, etc.

The range of millimeter-wave (mm-wave) transmissions is typically a couple of hundreds of meters. So, even with resolution where each grid cell is 1 m×1 m, there will be about 3.1*500*500 cells in a radius of 500 meters from an antenna, which will require about 800,000 rays. Assuming that computation of a single ray is in less than a millisecond, coverage could be computed in a few minutes, or less. A lower resolution or a smaller transmission range will require even less computation time. Also, using graphics processing units (GPUs) can speedup computations.

FIG. 2B illustrates a grid over an area, such as the area shown in FIG. 2A. First cells $202b$ may be associated with (a portion of) a first coverage area corresponding to a first antenna $204b$, second cells $212b$ may be associated with (a portion of) a second coverage area corresponding to a second antenna $214b$, and third cells $222b$ may be associated with (a portion of) a third coverage area corresponding to a third antenna $224b$. The boxes $234b$ may correspond to areas/regions where the coverage is insufficient (e.g., where the coverage is less than a threshold). The cell $242b$ may correspond to the intersection of two antennas (e.g., the antennas $214b$ and $224b$) and it is included in the coverage areas of these two antennas.

FIG. 2C illustrates the coverage area of an antenna $204c$ that is discovered by examining rays from the antenna $204c$ to the centers of grid cells (e.g., grid cells $202c$) and including in the result only the grid cells for which the ray is not obstructed, i.e., not intersected by any cuboid (which represents a geospatial obstacle). Different propagation models can be applied in this computation.

The partition of the area into cells can be such that in some areas the cells will be big (low resolution), to increase the efficiency, while in other areas the cells will be small (high resolution) to provide more accurate computations in such areas. To do that, initially a low-resolution grid will be created. Then, cells in areas where the resolution should be high will be repartitioned. This repartitioning can repeat, recursively, as much as needed, that is, until the resolution is high enough in all the places that require high resolution. In one or more embodiments, at least some, and maybe the entirety, of a geographic area is partitioned into a plurality of cells.

As to adding a coverage area: based on statics regarding usage or based on other considerations, a network engineer or planner will discover areas where the cellular coverage is insufficient, e.g., the areas within the boxes $234b$ in FIG. 2B. For each potential antenna A, with given location and other parameters (e.g., transmission strength, frequency, tilt, etc.) the coverage of A is a set C(A) of the cells covered by A. For each potential installation, the set C(A) may intersect the coverage set of a different antenna A', and the result is the set Int(A, A')=C(A)∩C(A') of the cells that are in both sets. In these cells there could be an interference between the transmissions, so the goal is to reduce (e.g., minimize) Int(A, A') or prevent interference altogether. In the continuous version, the coverage of an antenna can be a function that describes the area as a geometrical shape, e.g., a disk whose center is the antenna location and the radius is the transmission range, a sector, a polygonal area, etc.

As to constraints and budget: as part of the problem, the planner is given a budget, e.g., in the form of the number of antennas to install, or in dollars, where different types of antennas might have a different cost (installation and maintenance). The planner would have a set U of potential locations for new antennas, like utility poles, e.g., the utility poles $236b$ depicted in and near the boxes $234b$ (insufficient area) in FIG. 2B. For each utility pole, or other installation location, there is a height that affects the coverage area, and it could be surrounded by geospatial obstacles that affect the coverage. For a given utility pole u∈U, the coverage area C(u) can be computed, as explained above. Additional constraints may be defined per each location, e.g., on frequencies (might affect the propagation model), tilt, transmission strength and other parameters.

As to objective function: the minimization goal, or objective function, can be defined in different ways. There are several goals, and the objective function can be based on one or several of them. The following are some of the possible goals: (1) increase (e.g., maximize) coverage of the areas that are marked as priority areas (e.g., the areas within the circles $202a$ in FIG. 2A or the areas within the boxes $234b$ in FIG. 2B), i.e., reduce (e.g., minimize) the number of uncovered grid cells in these areas; (2) reduce (e.g., minimize) interference; (3) increase (e.g., maximize) throughput, e.g., by taking into account different configuration parameters and the usage data per covered grid cells; and (4) increase (e.g., maximize) physical resource block (PRB) or spectral segment utilization. The objective function can be a weighted sum of functions, to represent a combination of goals, e.g., f(x)=0.75*{# uncovered cells in priority areas}+ 0.2*{#cells in intersections}−0.5*{# covered cells in non-priority areas} where the objective is to minimize function f(x), where x is a selection of locations for new antennas. As a discrete problem, a variable xi may be defined per each potential location where xi=1 if the location is selected, xi=0 if the location is not selected, and the set of constraints includes Σxi=m, where m is the total number of new antennas. The counts could be considered accordingly, e.g., for set C(xi) referring to location xi, the number of cells in the set would be counted as xi*|C(xi)|, where |C(xi)| is the size of the set C(xi). Note that when the location is not selected, xi=0, so the multiplication is 0 because there are no covered cells. When the location is selected, xi=1, so the multiplication is |C(xi)|. Similarly, for intersection sets and for the set Int(xi, xj), the size xi*xj*|Int(xi, xj)| is not 0 only if both xi and xj are non-zero, i.e., there is an intersection only if the two antennas are selected.

The solution to the optimization problem provides the optimal site locations for the newly deployed antennas, under the specified constraints.

As to macrocell and microcell: in some settings there could be the option to deploy either a microcell or a macrocell at a selected site. This would cause a difference in the transmission range and other parameters, for these two options. Each option would cover a different set of grid cells, would have different propagation models and different frequencies that would cause different interference patterns, and so on. To model that, in a site where there is an option to deploy either a microcell or a macrocell, two variables may be used/defined, say $xi^m$ and $xi^M$. The variable $xi^m=1$ is set if a microcell is deployed in the site; otherwise, $xi^m=0$. The variable $xi^M=1$ is set if a macrocell is deployed in the site; otherwise, $xi^M=0$. The constraints are set accordingly, the coverage size is multiplied by the selection variable, as explained above, and the computation with respect to the objective function is conducted in the same way as described above.

As to parameter setting: different parameters can affect the behavior of a cellular antenna, including orientation, tilt, transmission strength, frequency, and so on. Each change in a parameter could change the coverage area and the intersection between coverage areas of different antennas. Therefore, choosing the right parameters should be part of the optimization problem. Multiple approaches can be performed to do so.

As to two-step computation: in this approach, the first step is to select the antenna sites for a standard (default) selection of the parameters. Then, the optimizer applies a greedy search by changing parameters for antennas, like the tilt, the transmission strength, etc. In each step, the change that improves the results the most, according to the objective function, is adopted. The iteration continues until no change that improves the results can be found. This is an effective method but the partition into two steps might lead to a non-optimal solution. The initial selection of sites is only optimal for the standard parameter selection and the parameter selection in the second computation step is only optimal for the site locations selected in the first step.

Representing parameter selection with variables. The second approach to cope with parameter selection is to introduce new variables. For each combination of site location, tilt, signal strength and frequency there would be a different variable that would be set to 1 if an antenna should be installed with these parameters at the given site, and 0 otherwise. For example, suppose that there are 3 tilt options, 2 signal strength options and 3 possible frequencies, then for a given site there would be 3*2*3=18 variables, and each variable will represent an installation with a different combination of tilt, signal strength and frequency. For each variable, the coverage set will be computed based on the parameters it represents. (If two combinations have the same coverage set or very similar coverage sets and interference patterns, for speeding up the computation, one of the combinations and its variable could be discarded.) The computation of the assignment to the variables according to the objective function will be as described above. The assignment to the variables will determine the parameter selection along with the site selection. The limitation of the approach is the need to introduce new variables, which could make the computation more expensive.

As to computation: as explained above, the planning task can be formulated as an integer linear programming or mixed integer programming optimization problem and it can be solved using one of the common algorithms for such problems, e.g., Cutting-plane method, Branch and bound, Branch and cut, or Branch and price. The problem can then be provided to a mathematical programming language (AMPL) and Integer Programming solvers like International Business Machines (IBMs) ILOG CPLEX Optimization Studio (commonly referred to in the art as CPLEX).

Figure 2D:
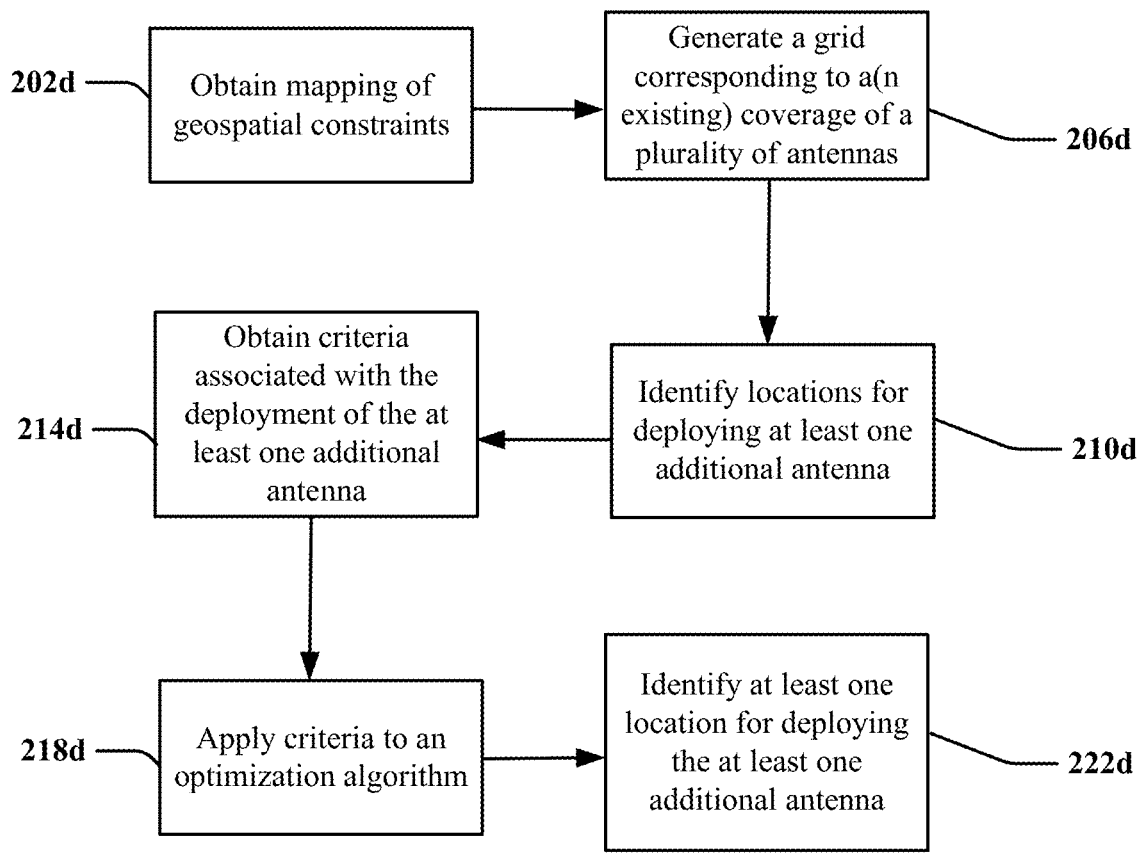
FIG. 2D depicts an illustrative embodiment of a method in accordance with various aspects described herein.

Referring now to FIG. 2D, an illustrative embodiment of a method 200d in accordance with various aspects described herein is shown. The method 200d may be facilitated (e.g., executed), in whole or in part, by one or more systems, devices, and/or components, such as for example the systems, devices, and components set forth herein.

In block 202d, a mapping of geospatial constraints may be obtained. The mapping may be obtained relative to a geographic area. The geographic area may correspond to at least a portion of a planning area. The mapping may include a 3D vectorial model of the geographic area. The mapping may include a DSM representation of the geographic area, a DEM representation of the geographic area, a DTM representation of the geographic area, or any combination thereof.

In block 206d, a grid may be generated corresponding to a coverage of each of a plurality of antennas within the geographic area. In this respect, the grid may be generated based on the mapping of block 202d. In some embodiments, the generating of the grid in block 206d may be based on obtaining at least one parameter/parametric value associated with each of the plurality of antennas.

The generating of the grid in block 206d may include obtaining at least one measurement associated with an antenna (e.g., a first antenna) of the plurality of antennas. For example, the at least one measurement may include: a first measurement associated with a downlink transmission from the antenna to a first communication device, a second measurement associated with an uplink transmission from the first communication device or a second communication device to the antenna, or a combination of the downlink transmission and the uplink transmission.

The generating of the grid in block 206d may include generating an estimate of coverage associated with an antenna (e.g., a second antenna) of the plurality of antennas. The estimate of the coverage may be based on an identification of a frequency or frequency band of communications that are to be supported by the antenna. The estimate of the coverage may be based on an identification of a transmission power level of communications that are to be supported by the antenna. The estimate of the coverage may be based on an identification of an orientation that the antenna is to have when deployed. The identification of the orientation may include an identification of a tilt of the antenna relative to a mounting structure. The mounting structure may be one of a communication tower, a utility pole, a building, or a water tower. In some embodiments, block 206d may include identifying a deployment of the antenna as being part of one of a microcell or a macrocell, resulting in an identified deployment. The estimate of the coverage associated with the antenna may be based on the identified deployment.

The generating of the grid in block 206*d* may include partitioning at least a portion of the geographic area into a plurality of cells. The partitioning may include, or result in, a first plurality of cells (included in the plurality of cells) with a first resolution and a second plurality of cells (included in the plurality of cells) with a second resolution that is different from (e.g., is greater than) the first resolution. In some embodiments, at least one of the cells in the first plurality of cells may be repartitioned to increase a resolution associated with the at least one of the cells from the first resolution to the second resolution or a third resolution.

In block 210*d*, a plurality of locations (e.g., a plurality of candidate locations) may be identified for deploying at least one additional antenna. The identification of the plurality of locations may be based on the grid of block 206*d*.

In block 214*d*, criteria may be obtained associated with the deployment of the at least one additional antenna. The criteria may include reducing a number of uncovered cells (e.g., reducing the number of cells that lack coverage/service or facilitate coverage/service in an amount that is less than a threshold). The criteria may include reducing interference associated with at least one cell included in the grid. The criteria may include increasing a throughput associated with at least one cell included in the grid. The criteria may include increasing an efficiency of a utilization of a resource associated with at least one cell included in the grid. The resource may include a PRB or a spectral segment.

In block 218*d*, the criteria (of block 214*d*) may be applied to an optimization algorithm. The application of the criteria to the optimization algorithm may satisfy an objective function. The objective function may be identified as part of block 218*d*.

In block 222*d*, at least one location included in the plurality of locations (identified as part of block 210*d*) may be identified for deploying the at least one additional antenna. The identification of the at least one location may be based on the applying of the criteria to the optimization algorithm (to satisfy the objective function) as provided in block 218*d*. Block 222*d* may include deploying one or more antennas at one or more locations included in the at least one location.

In some embodiments, block 210*d* and/or block 214*d* may include identifying a range of values for at least one parameter associated with the at least one additional antenna. In this respect, the identifying of the at least one location of block 222*d* may be (further) based on the identifying of the range of values.

Aspects of the method 200*d* (inclusive of aspects of blocks 210*d*, 214*d*, and 222*d*) may be executed iteratively or repeatedly. For example, in some embodiments a value (included in the range of values) for the at least one parameter may be (iteratively) changed, and a change in coverage may be identified based on the change in value. The identification of the at least one location (in block 222*d*) may be (further) based on the identification of the change in coverage.

While for purposes of simplicity of explanation, the respective processes are shown and described, it is to be understood and appreciated that the claimed subject matter is not limited by the order of any blocks, as some blocks may occur in different orders and/or concurrently with other blocks from what is depicted and described herein. Moreover, not all illustrated blocks may be required to implement the methods described herein.

Aspects of this disclosure may be included/incorporated as part of one or more practical applications. For example, aspects of this disclosure may be utilized to facilitate an allocation of one or more resources, such as for example one or more antennas, transmitters, receivers, etc., associated with one or more communication networks. An allocation of resources may include the establishment of one or more parameters or parametric values for the communication network(s).

Aspects of this disclosure may facilitate network planning, maintenance, and troubleshooting activities. For example, aspects of this disclosure may streamline/reduce the amount of time that network operators or service providers need to allocate to such activities, while at the same time enhancing the accuracy of decision-making processes. Furthermore, aspects of this disclosure enable network operators and service providers to obtain insight into the impact that a decision has on the operations of a communication network before implementing the decision. In this respect, costly errors and mistakes may be reduced (e.g., avoided). In this respect, aspects of this disclosure represent substantial improvements relative to conventional technologies in terms of, e.g., technical sophistication and cost reduction.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100. For example, virtualized communication network 300 can facilitate in whole or in part selecting equipment locations such as of cellular antennas, based on a combination of a grid geospatial representation of a planning area and optimization algorithms (which can be combined with propagation models and a 3D model of the world) where the optimization algorithm can select a deployment from a large space of options and would make RAN planning much more efficient.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
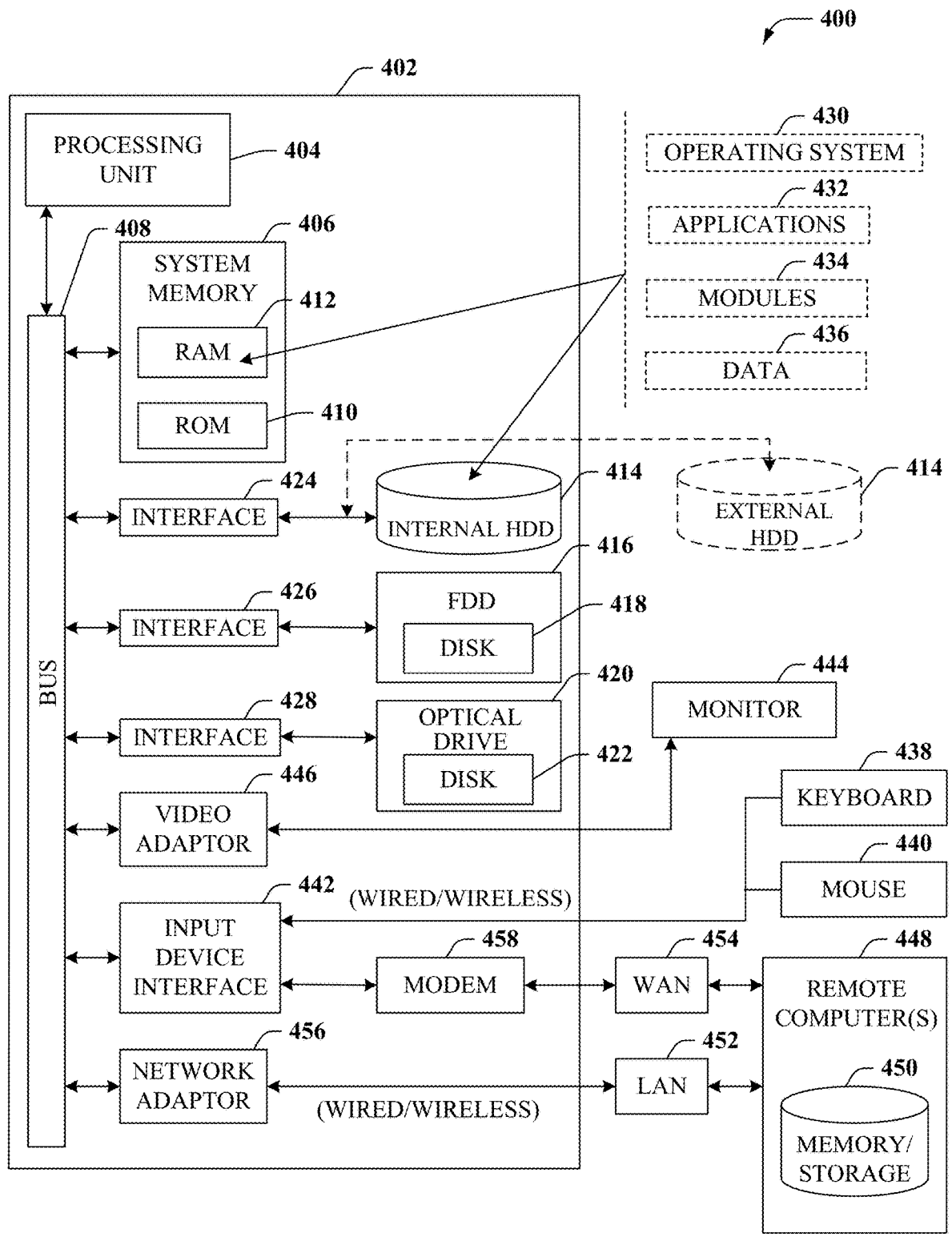
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting equipment locations such as of cellular antennas, based on a combination of a grid geospatial representation of a planning area and optimization algorithms (which can be combined with propagation models and a 3D model of the world) where the optimization algorithm can select a deployment from a large space of options and would make RAN planning much more efficient.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
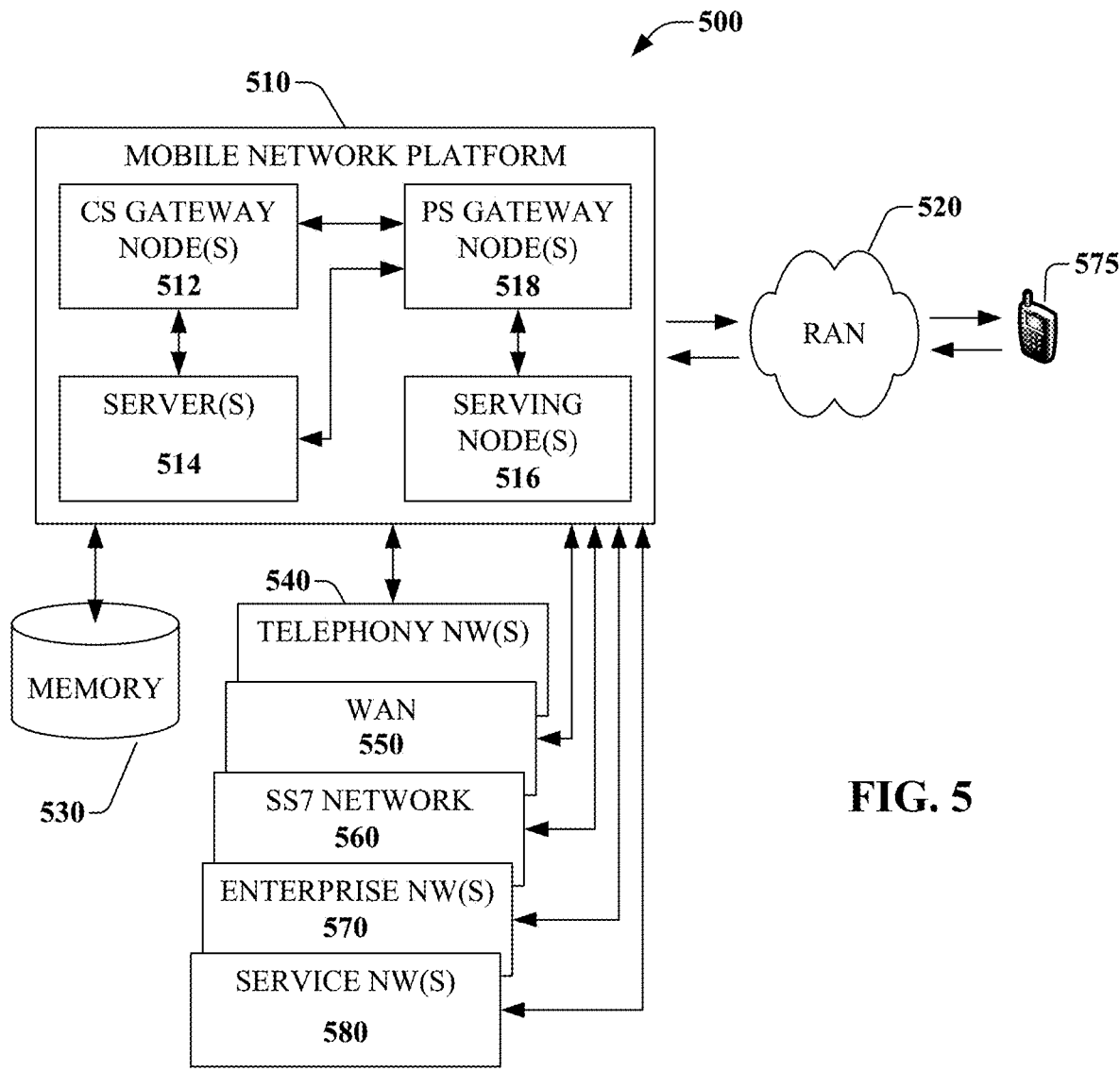
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting equipment locations such as of cellular antennas, based on a combination of a grid geospatial representation of a planning area and optimization algorithms (which can be combined with propagation models and a 3D model of the world) where the optimization algorithm can select a deployment from a large space of options and would make RAN planning much more efficient. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
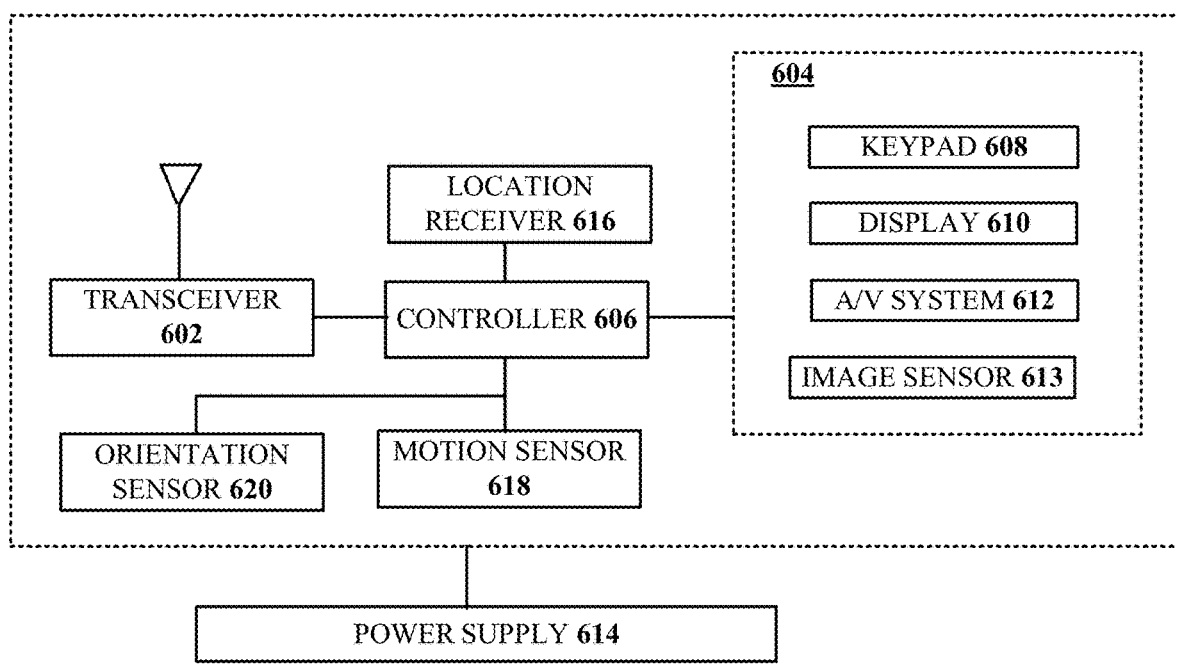
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting equipment locations such as of cellular antennas, based on a combination of a grid geospatial representation of a planning area and optimization algorithms (which can be combined with propagation models and a 3D model of the world) where the optimization algorithm can select a deployment from a large space of options and would make RAN planning much more efficient.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate a performance of operations, the operations comprising:
obtaining a mapping of geospatial constraints relative to a geographic area;
generating, based on the mapping, a grid corresponding to a coverage of each of a plurality of antennas within the geographic area;
identifying, based on the grid, a plurality of locations as candidates for deploying at least one additional antenna;
obtaining criteria associated with the deploying of the at least one additional antenna;
applying the criteria to an optimization algorithm to satisfy an objective function; and
identifying, based on the applying the criteria to the optimization algorithm to satisfy the objective function, at least one location included in the plurality of locations for deploying the at least one additional antenna.

2. The device of claim 1, wherein the generating of the grid comprises partitioning at least a portion of the geographic area into a plurality of cells.

3. The device of claim 2, wherein the plurality of cells comprises a first plurality of cells with a first resolution and a second plurality of cells with a second resolution that is different from the first resolution.

4. The device of claim 3, wherein the second resolution is greater than the first resolution, and wherein the operations further comprise:
repartitioning at least one of the cells of the first plurality of cells to increase a resolution associated with the at least one of the cells from the first resolution to the second resolution or a third resolution.

5. The device of claim 1, wherein the mapping comprises a three-dimensional (3D) vectorial model of the geographic area.

6. The device of claim 1, wherein the mapping comprises a digital surface model (DSM) representation of the geographic area, a digital elevation model (DEM) representation of the geographic area, a digital terrain model (DTM) of the geographic area, or any combination thereof.

7. The device of claim 1, wherein the generating of the grid comprises obtaining at least one measurement associated with a first antenna of the plurality of antennas.

8. The device of claim 7, wherein the at least one measurement comprises a first measurement associated with a downlink transmission from the first antenna to a first communication device, a second measurement associated with an uplink transmission from the first communication device or a second communication device to the first antenna, or a combination of the downlink transmission and the uplink transmission.

9. The device of claim 1, wherein the generating of the grid comprises generating an estimate of coverage associated with a first antenna of the plurality of antennas.

10. The device of claim 9, wherein the estimate of the coverage associated with the first antenna is based on: an identification of a frequency or frequency band of communications that are to be supported by the first antenna, an identification of a transmission power level of the communications that are to be supported by the first antenna, or a combination thereof.

11. The device of claim 9, wherein the estimate of the coverage associated with the first antenna is based on an identification of an orientation that the first antenna is to have when deployed, wherein the identification of the orientation comprises an identification of a tilt of the first antenna relative to a mounting structure, and wherein the mounting structure is one of a communication tower, a utility pole, a building, or a water tower.

12. The device of claim 9, wherein the operations further comprise:
identifying a deployment of the first antenna as being part of one of a microcell or a macrocell, resulting in an identified deployment,
wherein the estimate of the coverage associated with the first antenna is based on the identified deployment.

13. The device of claim 1, wherein the criteria comprise: reducing a number of uncovered cells included in the grid, reducing interference associated with at least one cell included in the grid, increasing a throughput associated with at least one cell included in the grid, increasing an efficiency of a utilization of a resource associated with at least one cell included in the grid, or any combination thereof.

14. The device of claim 1, wherein the operations further comprise:
obtaining at least one parameter associated with each of the plurality of antennas,
wherein the generating of the grid is further based on the obtaining of the at least one parameter associated with each of the plurality of antennas.

15. The device of claim 1, wherein the operations further comprise:
identifying a range of values for at least one parameter associated with the at least one additional antenna,
wherein the identifying of the at least one location is further based on the identifying of the range of values.

16. The device of claim 15, wherein the operations further comprise:
iteratively changing, within the range of values, a value for the at least one parameter; and
identifying a change in coverage in accordance with the changing of the value,
wherein the identifying of the at least one location is further based on the identifying of the change in coverage.

17. A non-transitory machine-readable medium, comprising executable instructions that, when executed by a processing system including a processor, facilitate a performance of operations, the operations comprising:
identifying, based on a coverage of each of a plurality of antennas within a geographic area, a plurality of locations as candidates for deploying at least one additional antenna;
obtaining criteria associated with the deploying of the at least one additional antenna;
applying the criteria to an optimization algorithm to satisfy an objective function; and
identifying, based on the applying the criteria to the optimization algorithm to satisfy the objective function, at least one location included in the plurality of locations for deploying the at least one additional antenna.

18. The non-transitory machine-readable medium of claim 17, wherein the operations further comprise:
obtaining a mapping of geospatial constraints relative to the geographic area,
wherein the coverage is based on the mapping.

19. A method, comprising:
obtaining, by a processing system including a processor, a mapping of geospatial constraints relative to a geographic area, the geographic area including a first antenna;
identifying, by the processing system and based on the obtaining of the mapping, a plurality of locations as candidates for deploying at least one additional antenna;
obtaining, by the processing system, criteria associated with the deploying of the at least one additional antenna;
applying, by the processing system, the criteria to an optimization algorithm to satisfy an objective function; and
identifying, by the processing system and based on the applying the criteria to the optimization algorithm to satisfy the objective function, at least one location included in the plurality of locations for deploying the at least one additional antenna.

20. The method of claim 19, wherein the at least one location comprises a first location and a second location, and wherein the at least one additional antenna comprises a second antenna configured as a microcell at the first location and a third antenna configured as a macrocell at the second location.

* * * * *